(12) United States Patent
Chie

(10) Patent No.: US 7,603,111 B2
(45) Date of Patent: Oct. 13, 2009

(54) SYSTEM FOR MOBILE INSTANT MESSAGING SERVICE USING MOBILE COMMUNICATION TERMINAL AND METHOD THEREOF

(75) Inventor: Sung Kyu Chie, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 11/327,004

(22) Filed: Jan. 4, 2006

(65) Prior Publication Data

US 2006/0148499 A1 Jul. 6, 2006

(30) Foreign Application Priority Data

Jan. 5, 2005 (KR) ............... 10-2005-0000748

(51) Int. Cl.
*G06F 15/00* (2006.01)
(52) U.S. Cl. .................... 455/414.1; 455/418
(58) Field of Classification Search ............ 455/412.2, 455/414.1, 418, 466, 574
See application file for complete search history.

(56) References Cited

U.S. PATENT DOCUMENTS

| 2001/0044299 | A1 | 11/2001 | Sandegren |
| 2002/0072352 | A1 | 6/2002 | Jana et al. |
| 2004/0038688 | A1 | 2/2004 | Zabawshyj et al. |
| 2005/0203892 | A1* | 9/2005 | Wesley et al. ............. 707/3 |
| 2006/0101119 | A1* | 5/2006 | Qureshi et al. ............. 709/206 |

FOREIGN PATENT DOCUMENTS

| CN | 1404288 | 3/2003 |
| CN | 1460215 | 12/2003 |
| JP | 2004023374 | 1/2004 |
| JP | 2004229296 | 8/2004 |
| KR | 2004-96331 | 11/2004 |

* cited by examiner

*Primary Examiner*—Sam Bhattacharya
(74) *Attorney, Agent, or Firm*—Workman Nydegger

(57) ABSTRACT

A system for a mobile instant messaging service using a mobile communication terminal is disclosed. The system includes a mobile communication terminal provided with an instant messaging function, an instant messaging server providing a mobile instant messaging service by sharing information between a plurality of mobile communication terminals having subscribed to a service, and a mobile switching center server providing call status information of the mobile communication terminal to the instant messaging server to have service subscriber's call status information reflected in presence information provided to the terminal from the instant messaging server.

21 Claims, 11 Drawing Sheets

SYSTEM FOR MOBILE INSTANT MESSAGING SERVICE USING MOBILE COMMUNICATION TERMINAL AND METHOD THEREOF

CROSS REFERENCE TO RELATED APPLICATIONS

This application claims the benefit of the Korean Patent Application No. 10-2005-0000748, filed on Jan. 5, 2005, which is hereby incorporated by reference in its entirety.

BACKGROUND OF THE INVENTION

1. Field of the Invention

The present invention relates to a mobile instant messaging service system, and more particularly, to a mobile instant messaging service system using a mobile communication terminal.

2. Discussion of the Related Art

In recent years, as the number of Internet users has rapidly risen, various Internet services have been developed and provided to these users. One such Internet service is instant messaging. Instant messaging is an Internet community service that enables users on the Internet to perform real-time character, voice and/or video chatting. In some applications, the instant messaging may be applied to a mobile communication service to enable a mobile instant messaging service.

Referring to FIG. 1, a mobile instant messaging service system in accordance with the prior art is illustrated. The system of FIG. 1 includes an IMPS (instant messaging providing system) server 120 (hereinafter referred to as "server") that provides a mobile instant messaging service to a plurality of terminal(s) 110. In addition, a MSC (mobile switching center) server 130 performs call handling services such as handling incoming calls, outgoing calls and the like for the terminal(s) 110.

The terminal(s) 110 include an instant messaging (IM) module 111 for message transactions with the IMPS server 120 and a call handling unit 112 for performing call handling through the MSC 130.

In particular, the modules 111 and 112 separately manage and handle instant messaging presence status information and call status information. Hence, there is no association between theses two modules.

Referring now to FIG. 2, an exemplary diagram of presence status information is shown. In FIG. 2, a presence function indicates status information for each user. Current status information for a called party appearing on an instant messenger is mainly divided into an off-line status and an on-line status. The on-line status is further divided into a conversation-enabled status and a busy or empty status.

FIG. 3 illustrates an exemplary flowchart of an operational process for a mobile instant messaging service in accordance with the prior art. Messages are exchanged between a first user designated as IM Client1, a second user designated as IM Client2 and a server designated as IM Server that provides mobile instant messaging services to the first and second users. In the following description, the first and second users, IM Client1 and IM Client2, which generally correspond to client terminals, shall be referred to as users for convenience of explanation.

First, if the first user IM Client1 transmits a login request message, LoginReq, to the IM Server, the server decides whether first user IM Client1 is a valid user through a subscriber database. The IM Server then transmits a response message, LoginRes, which indicates that a normal login procedure has been handled, to the first user IM Client1. The first user IM Client1 then transmits after completion of any authentication a message, UpdatePresenceReq=online, to the IM Server for requesting current status information of any users who are using the current messaging service. The IM Server extracts presence status information from a presence database and then provides the extracted information to the first user IM Client1. For example, the provided presence status information may be the status information about a 'friend' enjoying an instant messenger with the first user IM Client1. The 'friend' term is generally used in the instant messenger to mean a called party that provides her/his access state, personal information and the like and allows chatting or data transactions.

Subsequently, the IM Server notifies the second user IM Client2 that the second user IM Client2 should recognize that the first user IM Client1 has logged in (PresenceNotificationRequst). The second user IM Client2 may then transmit a recognition result (status) to the IM Server. For example, the presence status information is changed from an offline mode to an online mode in the instant messenger of the second user IM Client2, that is currently accessing the IM Server.

If the first user IM Client1 is temporarily unable to use the instant messenger, a corresponding message, UpdatepresenceReq=NA, is transmitted to the IM Server from the first user IM Client1. The IM Server then sends a response (Status) to the first user IM Client 1 and transmits presence status information for the first user IM Client1 to the second user IM Client2. In doing so, the presence status information of the first user IM Client1 is switched to a busy or empty status instead of being switched to a conversation-enabled status.

On the other hand, if first user IM Client1 requests a logout using the LogoutReq message, the IM Server sends the LogoutRes message in response. Subsequently, the IM Server provides logout status information for the first user IM Client1 to the second user IM Client2. Hence, the presence status information of the first user IM Client1 is switched to an offline mode on the instant messenger of the second user IM Client2.

Despite, however, the fact that transmission of all the signals is smoothly carried out, there are substantial time gaps in the recognition of the presence status information. Namely, there exists status time gaps A to C. For instance, in case of the status time gap A, there exists a time gap between the time of sending the message of approving the login to the first user IM Client1 from the IM Server and the time of providing the second user IM Client2 with the login status information of the first user IM Client1. In case of the status time gaps B or C, the status time gap has a concept similar to that of the status time gap A. In general, it is difficult to substantially retain status information of a called party (registered to a friend list) due to packet loss, delayed delivery, timeout and the like due to the poor radio environment. Even if all the message transmissions between the first user IM Client1 as a status changer, the second user IM Client2 as a status observer and the IM Server are normally performed, there always exists a status time gap between the actual status of the first user IM Client1 and the status of the first user IM Client1 that is detected by the second user IM Client2.

Referring now to FIG. 4, an exemplary flowchart of an operational process in the case that an error occurs in an instant messaging server is illustrated. Specifically, FIG. 4 depicts a case where there is a loss of a data packet in the transmission between the second user IM Client2 and the IM Server. Due to the loss of the data packet, a status conflict problem in which the second user IM Client2 keeps recognizing previous presence status information values different from actual presence status information of a first user IM Client1 is created.

In similar manner, FIG. 5 illustrates the flow chart of an operational process in the case that an error occurs in the instant messenger due the first user IM Client 1 becoming disconnected from the IM Server due to a power loss or other reason.

In this case, as the session between the first user IM Client1 and the IM Server is disconnected, the first user IM Client 1 is unable to change its presence status information. This fact gives rise to a conflict problem as the second user IM Client 2 is unable to receive actual status information for the first user IM Client1.

SUMMARY OF THE INVENTION

Accordingly, the present invention is directed toward systems and methods for a mobile instant messaging service using a mobile communication terminal that substantially obviate one or more problems due to limitations and disadvantages of the related art.

One embodiment herein described discloses a mobile communication terminal having an instant messaging function. The mobile communication terminal includes an instant messaging module for handling instant messaging data, a call processing unit performing call processing via a mobile switching center, and a control unit provided between the call processing unit and the instant messaging module to provide presence status information of a called party according to a call processing result performed through the call processing unit to the instant messaging module.

A further embodiment herein described discloses, a system for a mobile instant messaging service using a mobile communication terminal. The system includes a mobile communication terminal provided with an instant messaging function, an instant messaging server providing a mobile instant messaging service by sharing information between a plurality of mobile communication terminals having subscribed to a service, and a mobile switching center server providing call status information of the mobile communication terminal to the instant messaging server to have service subscriber's call status information reflected in presence information provided to the terminal from the instant messaging server.

An additional embodiment herein described discloses a system for a mobile instant messaging service using a mobile communication terminal. The system includes a mobile communication terminal provided with an instant messaging function, an instant messaging server providing a mobile instant messaging service by sharing status information between users having subscribed to a service, a personal computer performing the instant messaging function with the mobile communication terminal connected to the instant messaging server via Internet, and a mobile switching center server providing call status information of the mobile communication terminal to the instant messaging server to have service subscriber's call status information reflected in presence information provided to each of the users from the instant messaging server.

Still another embodiment herein described discloses a system for a mobile instant messaging service using a mobile communication terminal. The system includes a mobile communication terminal providing presence status information reflecting call status information using an instant messaging function, an instant messaging server providing a mobile instant messaging service between a plurality of mobile communication terminals having subscribed to a service and enabling the call status information provided from the mobile communication terminal to be shared by a user having subscribed to the service, and a mobile switching center server providing an outgoing/incoming call processing service of the mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to the various embodiments of the present invention, examples of which are illustrated in the accompanying drawings. Wherever possible, the same reference numbers will be used throughout the drawings to refer to the same or like parts.

Figure 1:
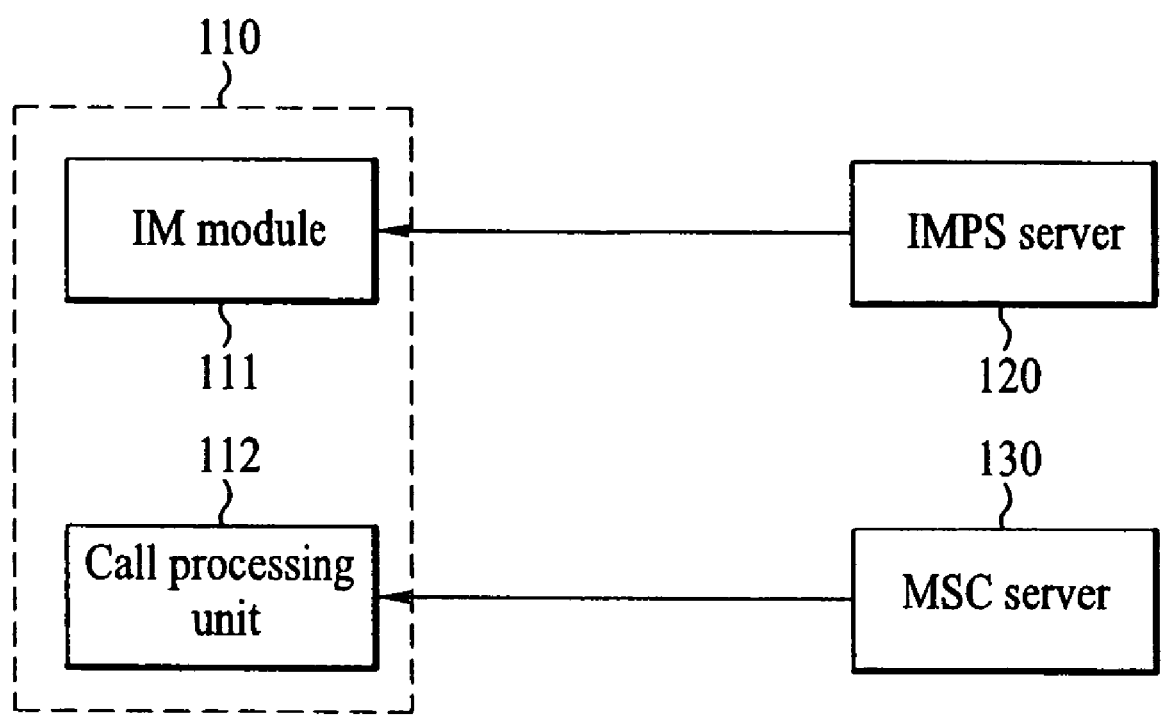
FIG. 1 is a schematic block diagram of a mobile instant messaging service system according to the prior art.
Figure 2:
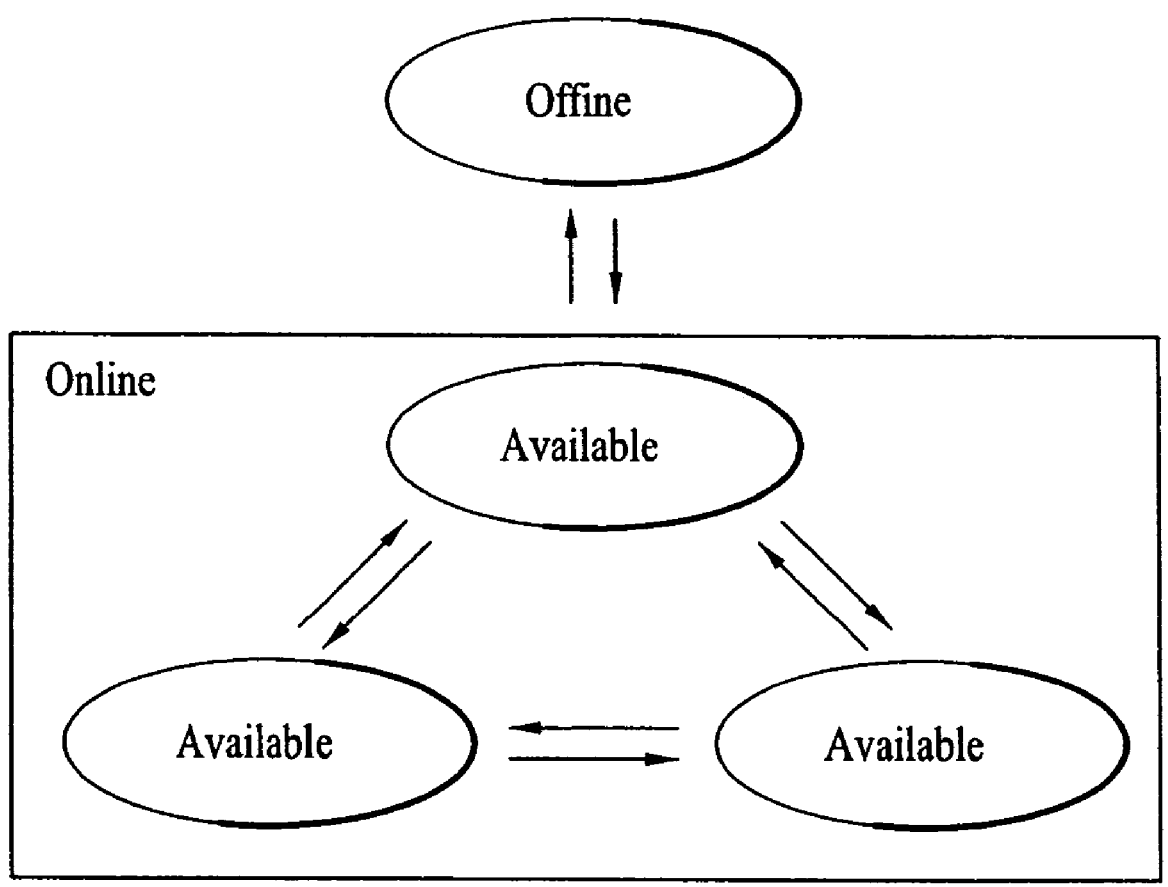
FIG. 2 is an exemplary diagram of presence status information.
Figure 3:
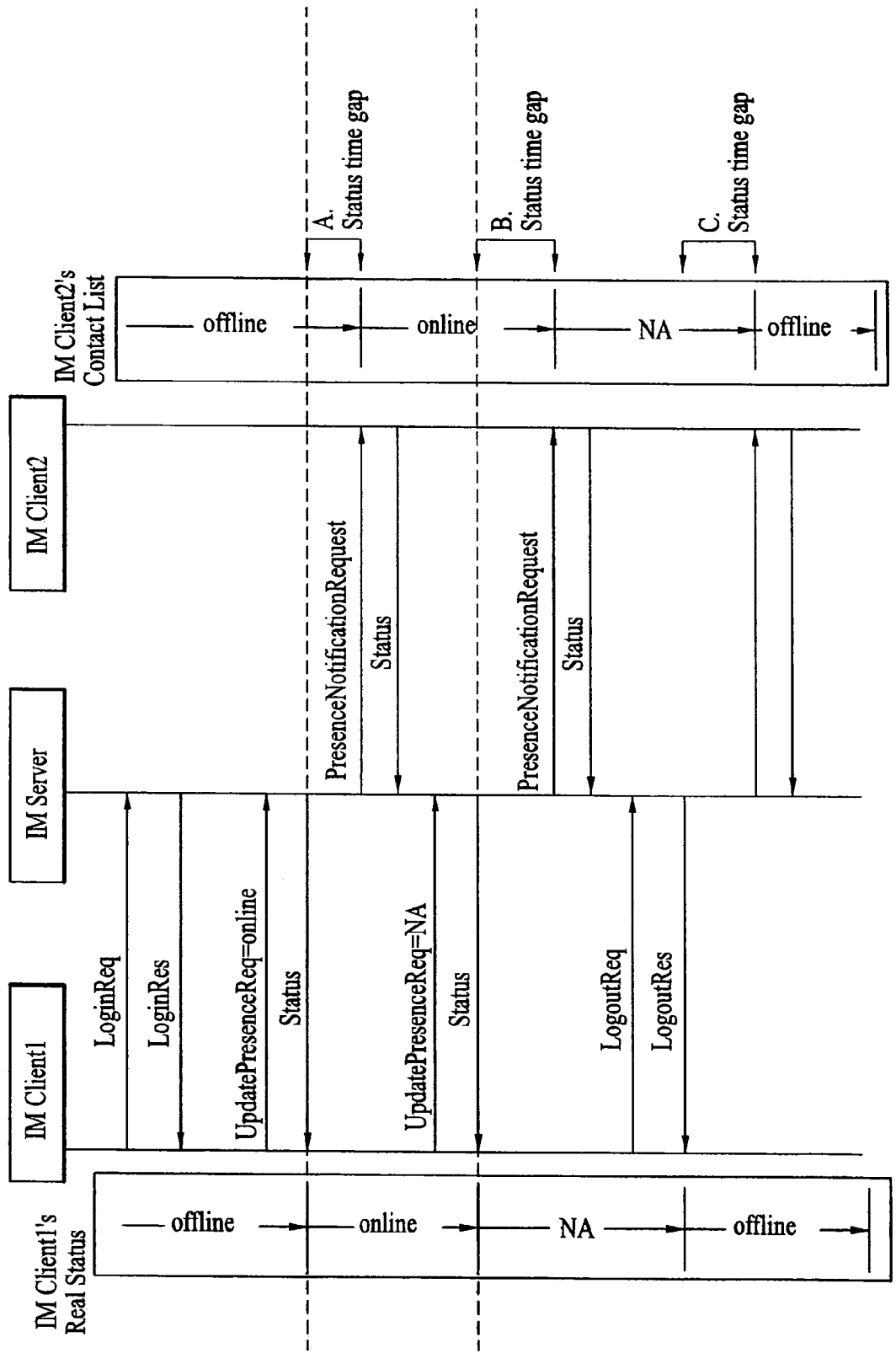
FIG. 3 is an exemplary flowchart of an operational process for a mobile instant messaging service according to the prior art.
Figure 4:
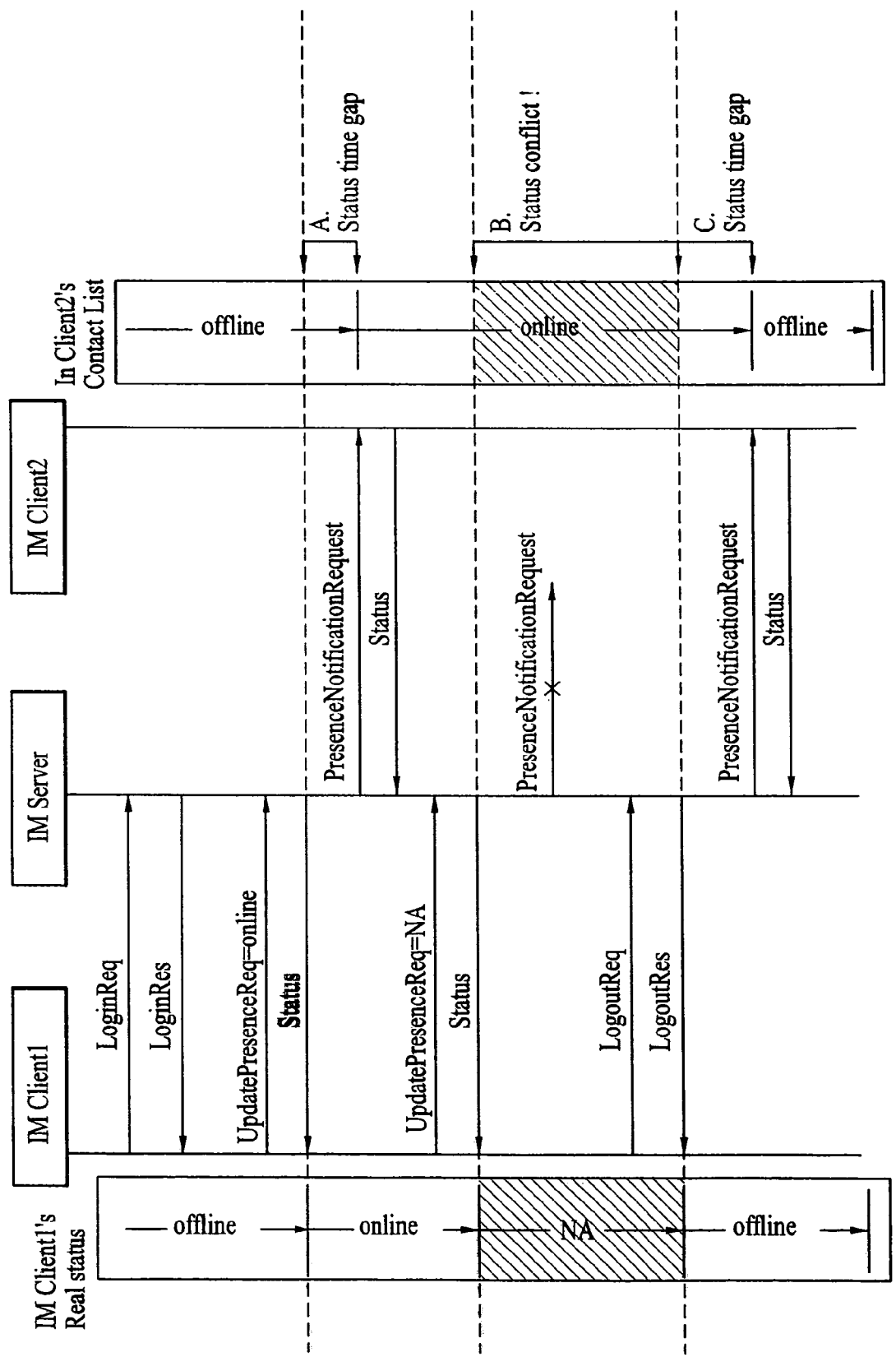
FIG. 4 is an exemplary flowchart of an operational process in case an error occurs in an instant messaging server.
Figure 5:
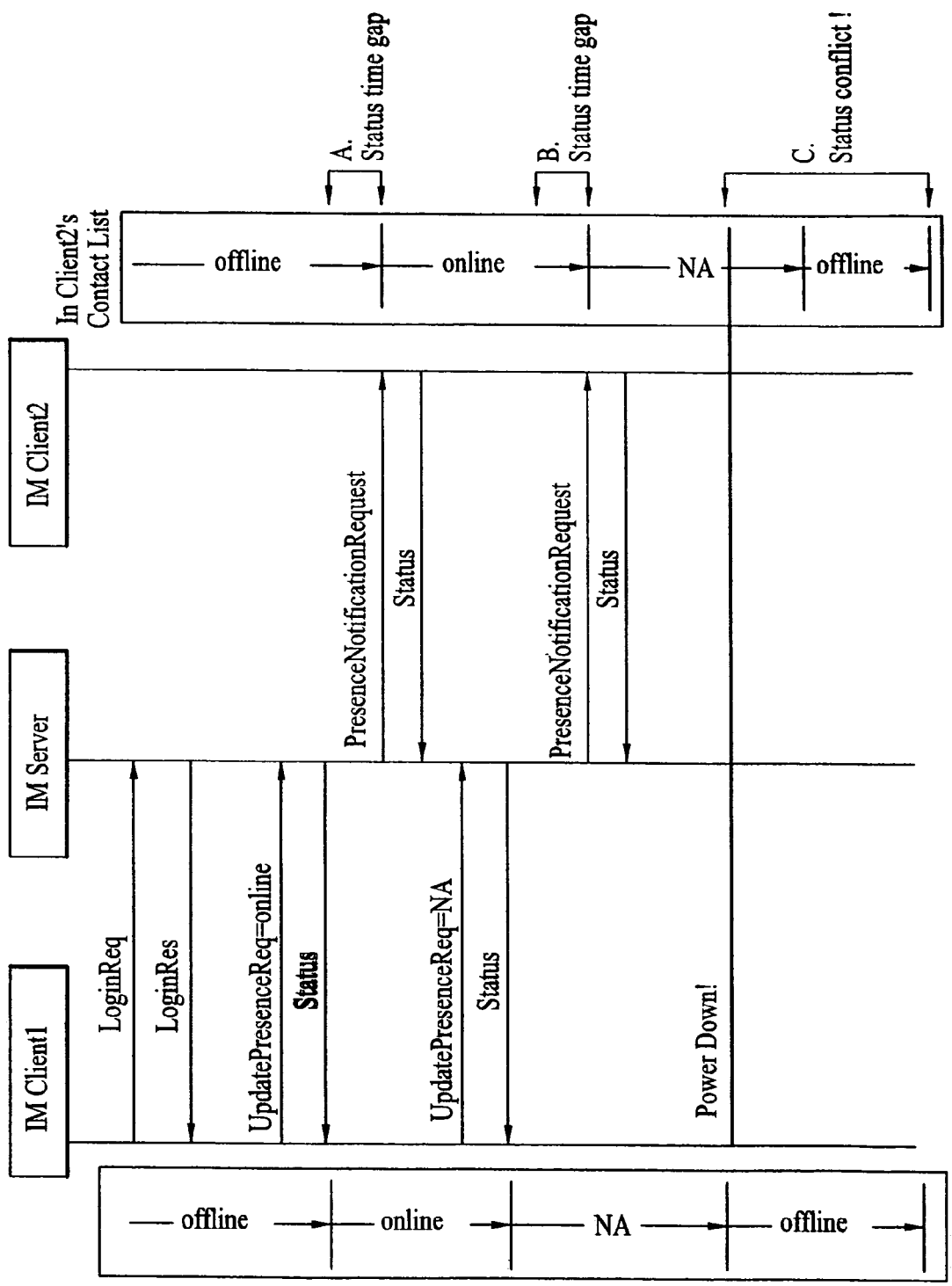
FIG. 5 is a further exemplary flowchart of an operational process in case an error occurs in an instant messaging user terminal.
Figure 6:
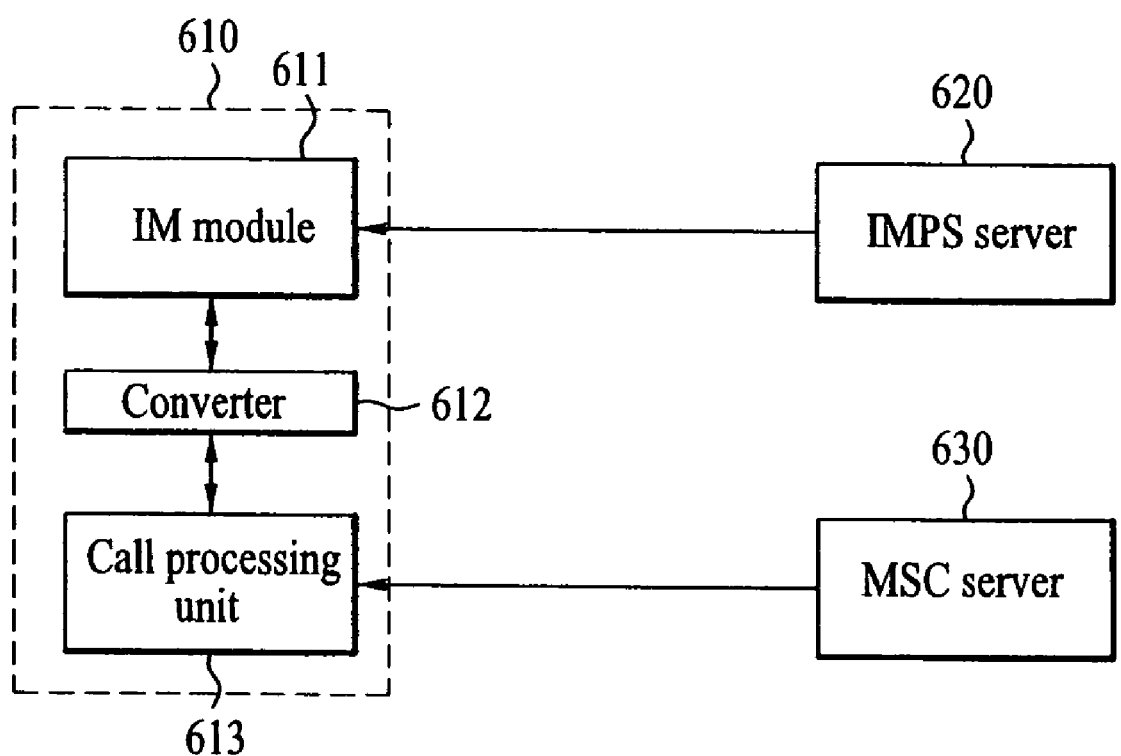
FIG. 6 is a schematic block diagram of a mobile instant messaging service system according to the principles of the present invention.

FIG. 6 is a schematic block diagram of a mobile instant messaging service system according to the present invention, in which one of various modifications of the system according to the present invention is shown. Note that the embodiments disclosed herein are for illustration only and are not intended to limit the scope of the invention in any way. In addition, the various modules, functional blocks and/or components as disclosed in relation to FIGS. 6-11 are for illustrative purposes only. As will be appreciated, there are any numbers of additional modules, functional blocks and/or components that may be used to practice the embodiments disclosed herein. Accordingly, any use of a specific module, functional block and/or component for performing a particular function, act, and/or step should not be used to limit any of the embodiments disclosed herein unless explicitly stated in this description.

Turning first to FIG. 6, a mobile instant messaging service system in accordance with a first embodiment of the present invention includes a mobile communication terminal(s) 610 provided with an instant messaging function, an IMPS (instant messaging providing system) server 620 providing a mobile instant messaging service by sharing various kinds of information between a plurality of mobile communication terminal(s) 610 having subscribed to a service, and a MSC (mobile switching center) server 630 providing call status information of the mobile communication terminal(s) 610 to the instant messaging server 620 so as to have the service subscriber's call status information reflected in presence information provided to the terminal(s) 610 from the instant messaging server 620. In other words, the call status information provided to the instant messaging server 620 from the mobile switching center server 630 is reflected in the presence status information provided from the instant messaging server 620 to the terminal(s) 610. In the embodiments to be described herein, the mobile communication terminal(s) 610 may be implemented as a cellular phone. However it is appreciated that in other embodiments the terminal(s) can include other voice communication devices, including 2-way radios, pagers, PDA-phones, etc. As such, the details of the embodiments to be described herein as applied to mobile communication terminal(s) should not be construed as limiting the present invention in any way. Note also that any message exchanged via the instant messaging system may include, but is not limited to, a character message, an e-mail, a voice e-mail or a moving picture e-mail or any other suitable data that may be exchanged via an instant messaging service.

In some embodiments, the instant messaging server 620 can be equipped with both wire and wireless instant messaging functions. In such embodiments, a mobile instant messaging service between a mobile communication terminal(s) and a computer can be achieved. In addition, in such embodiments, according to the basic concept of the present invention, the call status information is provided to the instant messaging server 620 from the mobile switching center server 630 in a manner similar to the previously described embodiment. Accordingly, a further description of such embodiments is not included in the description to follow.

According to a further embodiment of the present invention, call status information may be provided from a mobile communication terminal to an instant messaging server. This is in contrast to having the call status information provided from a mobile switching center server to an instant messaging server as described in the previous embodiments. A mobile instant messaging service system according such an embodiment includes a mobile communication terminal(s) 610 using an instant messaging function to provide presence status information reflecting call status information, an instant messaging server 620 for providing a mobile instant messaging service between a plurality of mobile communication terminal(s) 610 having subscribed to a service and enabling the call status information provided from the mobile communication terminal(s) 610 to be shared by a user having subscribed to the service, and a mobile switching center server 630 for providing an outgoing/incoming call processing service of the mobile communication terminal 610.

In this embodiment, the mobile communication terminal(s) 610 may also include a call processing unit 613 for performing communication processing with the mobile switching center server 630, an instant messaging module 611 for processing instant messaging data provided from the instant messaging server 620, and a converter 612 provided between the call processing unit 613 and the instant messaging module 611 for implementing an interface for data between the call processing unit 613 and the instant messaging module 611.

For example, suppose a current present status value of a first user stored in a presence database connected to IMPS server 620 is stored as "conversation available". If a second user attempts to call the first user, the line may be busy or the first user may not answer the call. In this case, the call status information provided from the call processing unit 613 will be provided to the instant messaging module 611 via the converter 612. The IM module 610 may then provide presence status information reflecting the call status information to the IMPS server 620, where it may be shared with other subscribers of the instant messaging service system as needed.

In this embodiment, converter 612 allows IM module 611 to have access to the call status information directly from call processing unit 613. IM module 610 may then provide presence status information reflecting call status information to the IMPS server 620 as previously described. The call status information of terminal 610 may then be indicated via the IMPS server 620. This call status information may be an offline mode, a call-available mode, a busy-line mode or a no-answering mode.

As mentioned previously, the mobile communication terminal(s) 610 may include a PDA (personal digital assistant), a cellular phone, a PCS (personal communication service) phone, a GSM (global system for mobile) phone, a W-CDMA (wideband CMDA) phone or an MBS (mobile broadband system). Note that this list of possible communication terminals is for illustration only. The embodiments disclosed herein contemplate any reasonable communication terminal. Accordingly, any reference to a specific communication terminal should not be used to limit the scope of the appended claims.

Figure 7:
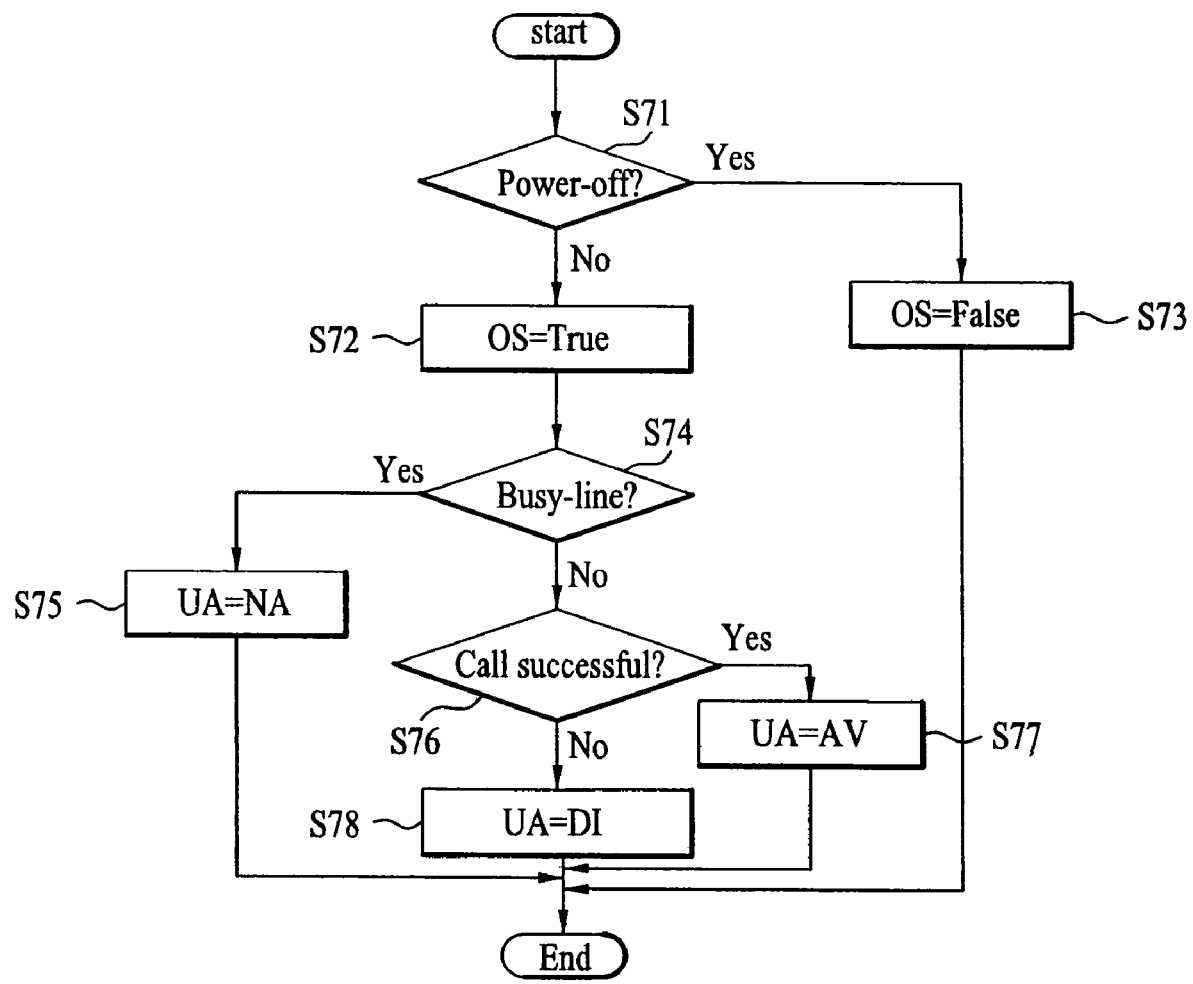
FIG. 7 is a flowchart of a call status deciding process in a mobile instant messaging service according to the principles of the present invention.

Turning now to FIG. 7, a flowchart of a call status deciding process in a mobile instant messaging service according to principles of the present invention is illustrated. First, it is decided whether the power of a called party is turned on (S71). If a phone of the called party is turned off (Yes in decision block S71), any conversation via the mobile instant messaging service is impossible due to abnormality created by the power being unexpectedly off in the called party. In this case, an online mode value OS is set to 'False' (S73). If, on the other hand, the power of the terminal of the called party is turned on (No in decision block S71), the online mode value OS is set to 'True' (S72).

In the case that the online mode value OS is 'True', it is then decided whether a line is busy (S74). If the line is busy (Yes in decision block S74), a normal conversation progress using the instant messenger is reserved. Hence, despite the online mode value OS being set to "True", a user availability (UA) mode value is set to 'Not Available (NA)' (S75).

In the case that the line is not busy (No in decision block S74), if a call is successful (Yes in decision block S76), the user availability (UA) mode value is set to "Available (AV)" (S77). Conversely, if the call is unsuccessful (No in decision block S76), it means that the called party is away from the mobile phone or is empty. In this case, the user availability mode value is set to "Discrete (DI)" (S78).

Figure 8:
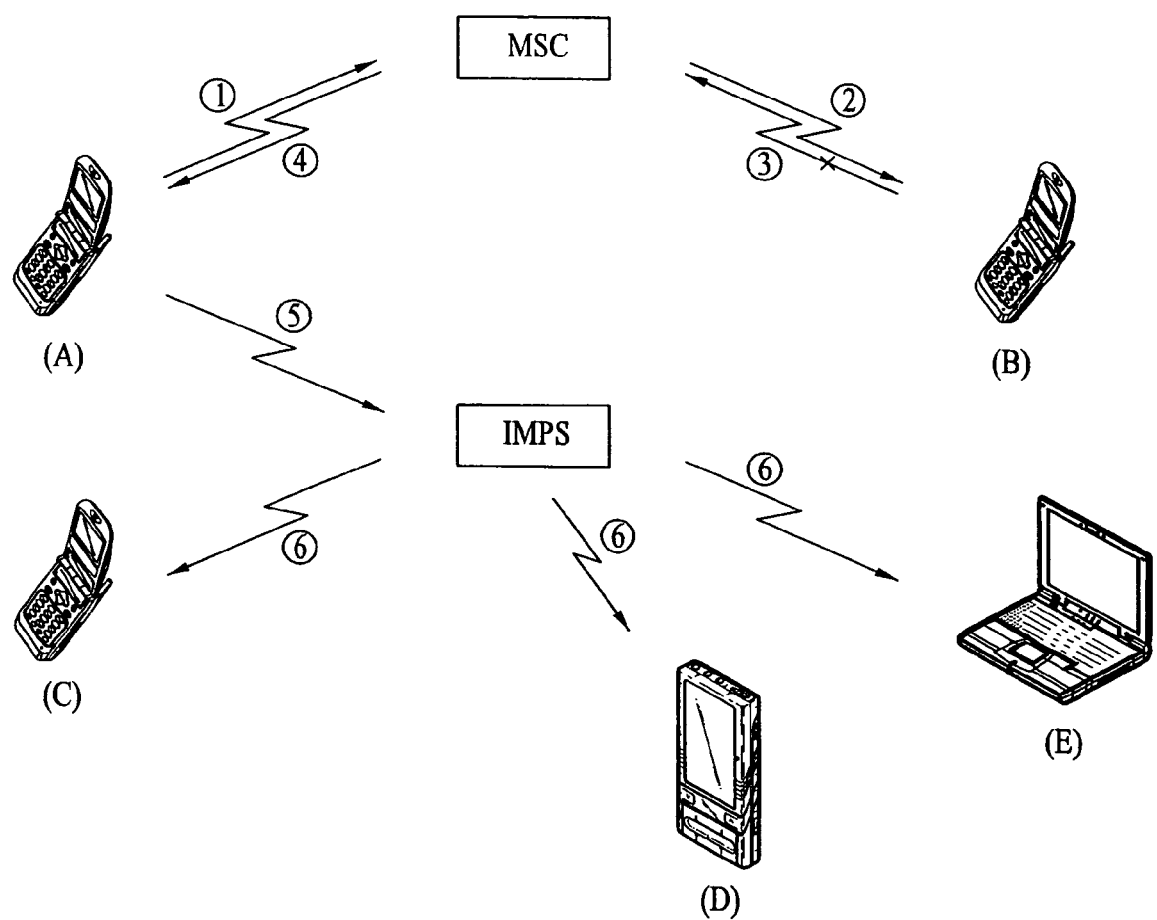
FIG. 8 is an exemplary diagram for explaining a progress of a call status deciding process in a mobile instant messaging service according to one embodiment of the present invention.

FIG. 8 illustrates an exemplary diagram for explaining the progress of a call status deciding process in a mobile instant messaging service according to one embodiments of the present invention. FIG. 8 first illustrates that a user of a mobile communication terminal (A) attempts a call (signal 1) to a user of a mobile communication terminal (B) through a mobile switching center MSC The mobile switching center MSC outputs a paging signal (signal 2) to terminal (B) The user of terminal (B) may be a member performing group communications with the user of terminal (A). Upon receiving the paging signal, a response signal (signal 3) from terminal (B) is delivered to terminal (A) via the mobile switching center MSC (signal 4). In this case, the response signal corresponds to one of various modes such as 'Busy-line', 'Power-off', 'Do Not Disturb' and the like.

Figure 9:
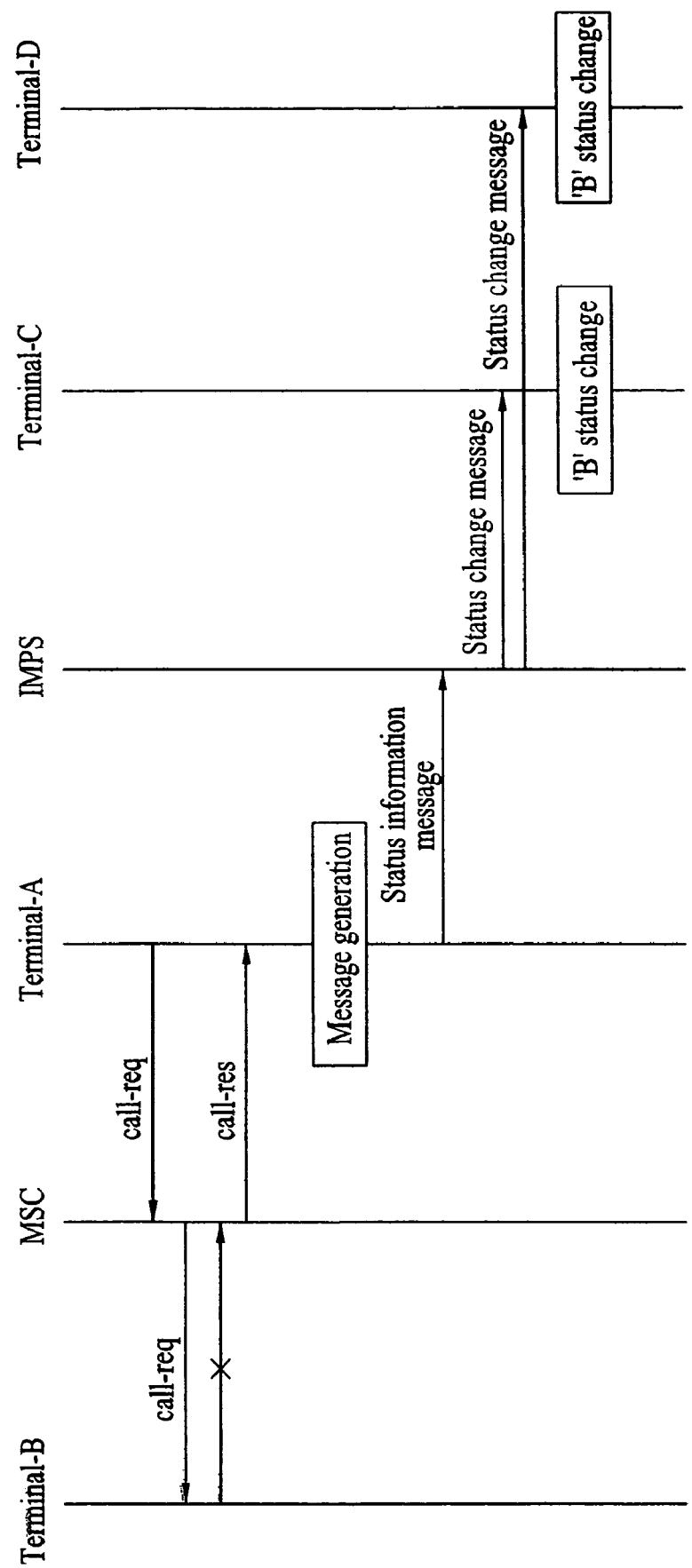
FIG. 9 is an exemplary flowchart of a signal processing of the progress shown in FIG. 8.

Once terminal (A) has received the response signal from terminal (B), an internal call processing unit, such as unit 613, coverts a call processing result to an instant message and then delivers it (signal 5) to an instant messaging server IMPS via an instant messaging (IM) module such as IM module 611. The instant messaging server IMPS extracts a current status of the user of terminal (B) from the received message (signal 5) to update a presence database. The presence information of terminal (B) may then be delivered (signal 6) to a plurality of group members C, D and E performing the group communications with terminal (B). Note that FIG. 8 and FIG. 9 illustrate that the mobile communications terminals may be a cell phone, PDA, or a computer. As mentioned above, this is for illustration only.

Referring now to FIG. 9, an exemplary flowchart of a signal processing of the progress shown in FIG. 8 is illustrated. For example, if terminal (A) transmits a call request signal call_req, illustrated as signal 1, to a mobile switching center MSC, the mobile switching center MSC pages terminal (B) as illustrated by signal 2. Subsequently, the mobile switching center MSC receives a call response signal call_res, illustrated as signal 3, from terminal (B) and delivers a call processing result call_res, illustrated as signal 4, to terminal (A). Terminal (A) then transmits an instant message including status information using the MSC to an IMPS as illustrated by signal 6. Subsequently, the IMPS transmits a status change message including status information of terminal (B) to a terminal of a user who is a member of group communications to which terminal (B) belongs as illustrated by signal 5.

Figure 10:
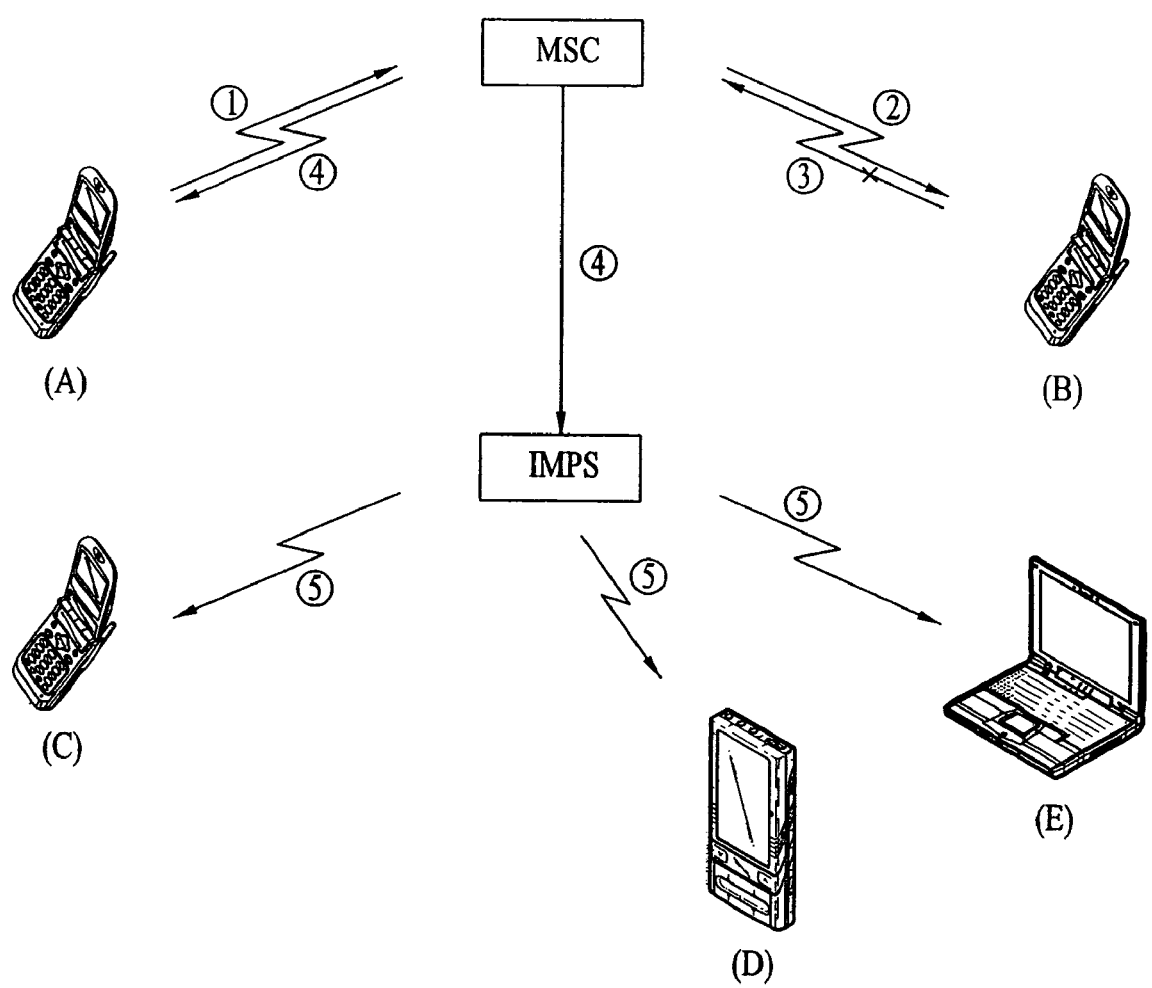
FIG. 10 is an exemplary diagram for explaining a progress of a call status deciding process in a mobile instant messaging service according to another embodiment of the present invention.

FIG. 10 is an exemplary diagram for explaining a progress of a call status deciding process in a mobile instant messaging service according to an additional embodiment of the present invention.

In FIG. 10, unlike the embodiment shown in FIG. 8, status information of Terminal-B is delivered from mobile switching center MSC to an IMPS connected to the mobile switching center MSC by wire after having the MSC decide the status information of Terminal-B though a call processing process. The IMPS updates a presence database and delivers presence information to members (e.g., Terminal-C and Terminal-D) of group communications to which the Terminal-B belongs.

Figure 11:
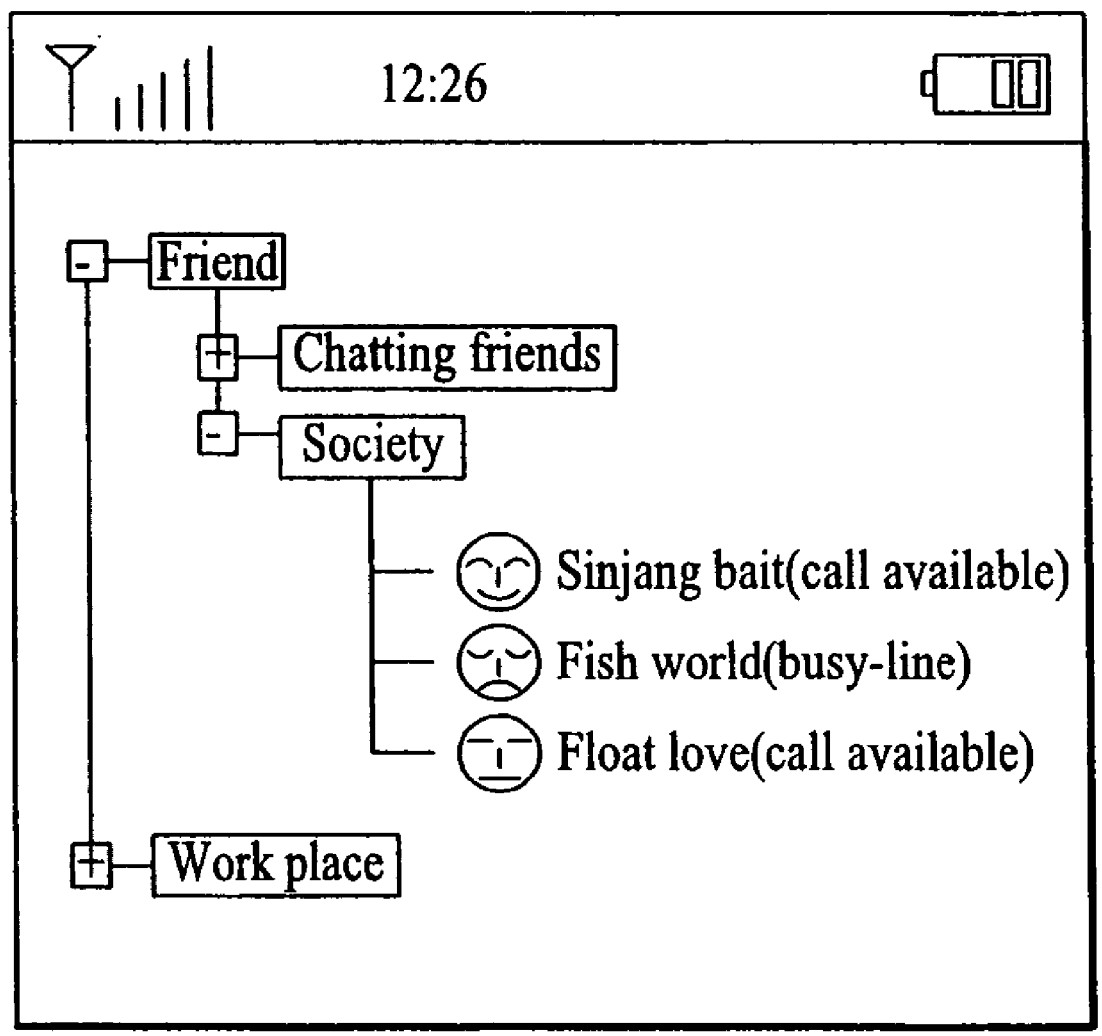
FIG. 11 is an exemplary status diagram of a terminal performing an instant messaging function according to an application of the present invention.

Referring now to FIG. 11, an exemplary status diagram of a terminal performing an instant messaging function according to an application of the present invention is illustrated. As illustrated, a friend information list in an instant messenger is displayed on a display unit of a mobile communication terminal. In the present embodiment, the friend information list has a tree structure to facilitate the recognition of friend information. Note, however, that the friend information list can be implemented in various other ways as well. Accordingly, the tree structure illustrated in FIG. 11 is for illustrative purpose only and should not be used to limit the scope of the appended claims. The display unit displays the present call status of the various parties in the friend information list. For example, the presence or non-presence of a party's connection may be displayed. If the connection is present, then a busy-line or call available status may be displayed. Accordingly, current present status information of a called party may be correctly and easily understood.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal having an instant messaging function, comprising:
    an instant messaging module handling instant messaging data;
    a call processing unit performing call processing via a mobile switching center; and
    a control unit provided between the call processing unit and the instant messenger module to provide call presence status information of a called party according to a call processing result performed through the call processing unit via the mobile switching center to the instant messaging module.

2. The mobile communication terminal of claim 1, wherein the data handled by the instant messaging module comprises a character message, an e-mail, a voice e-mail or a moving picture e-mail.

3. The mobile communication terminal of claim 1, wherein the status information of a group member appearing through the instant messaging module indicates an offline mode, a call-available mode, a busy-line mode or a no-answering mode.

4. A system for a mobile instant messaging service using a mobile communication terminal, comprising:
    a mobile communication terminal provided with an instant messaging function;
    an instant messaging server providing a mobile instant messaging service by sharing information between a plurality of mobile communication terminals having subscribed to the mobile instant messaging service; and
    a mobile switching center server providing call status information provided by the mobile communication terminal to the instant messaging server, wherein a mobile instant messaging service subscriber's call status information provided by the mobile communication terminal is reflected in presence information provided to the mobile communication terminal from the instant messaging server.

5. The system of claim 4, wherein the mobile communication terminal comprises a PDA (personal digital assistant), a cellular phone, a POS (personal communication service) phone, a GSM (global system for mobile) phone, a W-CDMA (wideband CMDA) phone or an MBS (mobile broadband system).

6. The system of claim 4, wherein a message exchanged via the instant messaging service comprises a character message, an e-mail, a voice e-mail or a moving picture e-mail.

7. The system of claim 4, wherein the subscriber's call status information indicated via the instant messaging service corresponds to an offline mode, a call-available mode, a busy-line mode or a no-answering mode.

8. A system for a mobile instant messaging service using a mobile communication terminal, comprising:
a mobile communication terminal provided with an instant messaging function;
an instant messaging server providing a mobile instant messaging service by sharing status information between users having subscribed to the service;
a personal computer performing the instant messaging function with the mobile communication terminal connected to the instant messaging server via the Internet; and
a mobile switching center server providing call status information provided by the mobile communication terminal to the instant messaging server, wherein a service subscriber's call status information provided by the mobile communication terminal is reflected in presence information provided to each of the users from the instant messaging server.

9. The system of claim 8, wherein the mobile communication terminal comprises a PDA (personal digital assistant), a cellular phone, a POS (personal communication service) phone, a GSM (global system for mobile) phone, a W-CDMA (wideband CMDA) phone or an MBS (mobile broadband system).

10. The system of claim 8, wherein a wire instant messenger provided from the instant messaging server is installed at the personal computer.

11. The system of claim 8, wherein a message exchanged via the instant messaging service comprises a character message, an e-mail, a voice e-mail or a moving picture e-mail.

12. The system of claim 8, wherein the subscriber's call status information indicated via the instant messaging service corresponds to an offline mode, a call-available mode, a busy-line mode or a no-answering mode.

13. A system for a mobile instant messaging service using a mobile communication terminal, comprising:
a mobile communication terminal providing presence status information reflecting call status information of a mobile communication system associated with the mobile communication terminal using an instant messaging function;
an instant messaging server providing a mobile instant messaging service between a plurality of mobile communication terminals having subscribed to the service and enabling the call status information provided from the mobile communication terminal to be shared by a user having subscribed to the service; and
a mobile switching center server providing an outgoing/incoming call processing service of the mobile communication terminal.

14. The system of claim 13, the mobile communication terminal comprising: a call processing unit for communication processing with the mobile switching center server;
an instant messaging module processing instant messaging data provided from the instant messaging server; and
a converter provided between the call processing unit and the instant messaging module to implement an interface of data between the instant messaging module and the call processing unit.

15. The system of claim 14, wherein the mobile communication terminal comprises a PDA (personal digital assistant), a cellular phone, a POS (personal communication service) phone, a GSM (global system for mobile) phone, a W-CDMA (wideband CMDA) phone or an MBS (mobile broadband system).

16. The system of claim 13, wherein a message exchanged via the instant messaging service comprises a character message, an e-mail, a voice e-mail or a moving picture e-mail.

17. The system of claim 13, wherein the subscriber's call status information indicated via the instant messaging service corresponds to an offline mode, a call-available mode, a busy-line mode or a no-answering mode.

18. A method of performing a mobile instant messaging service using a mobile communication terminal, comprising:
a call processing step of performing wireless mobile communications via a mobile switching center in the mobile communication terminal;
converting presence information according to the call processing step to an instant message; and
transmitting the instant message reflecting call status information to an instant messaging server using an instant messaging module via a wireless Internet in order to perform the mobile instant messaging service.

19. The method of claim 18, wherein the call status information corresponds to an offline mode, a call-available mode, a busy-line mode or a no-answering mode.

20. The method of claim 18, wherein the call status information corresponds to an offline mode, a call-available mode, a busy-line mode or a no-answering mode.

21. A method of performing a mobile instant messaging service using a mobile communication terminal, comprising:
receiving call status information of a subscriber terminal from a mobile switching center in an instant messaging server which is capable of providing a mobile instant messaging service via wireless Internet;
reflecting call status information received from the mobile switching center in presence information of a subscriber connected to the instant messaging server and storing the presence information in a subscriber presence database; and
transmitting the presence information stored in the presence database to a currently connected mobile communication terminal from the instant messaging server.

* * * * *

UNITED STATES PATENT AND TRADEMARK OFFICE
CERTIFICATE OF CORRECTION

| | | |
|---|---|---|
| PATENT NO. | : 7,603,111 B2 | Page 1 of 1 |
| APPLICATION NO. | : 11/327004 | |
| DATED | : October 13, 2009 | |
| INVENTOR(S) | : Sung Kyu Chie | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Fifth Day of October, 2010

David J. Kappos
*Director of the United States Patent and Trademark Office*